Dec. 8, 1959     L. J. WHITE     2,915,813
TOOL-RESISTANT METAL JAIL PLATES
Filed May 2, 1956
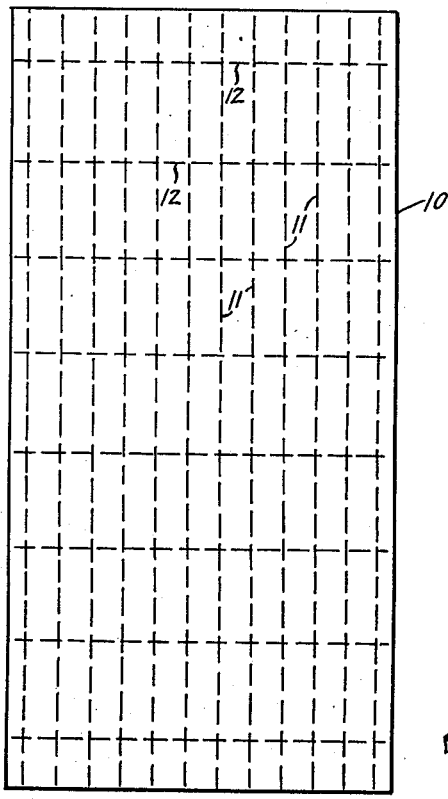
FIG. 1
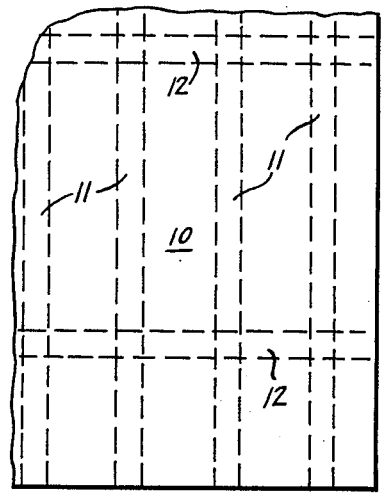
FIG. 2
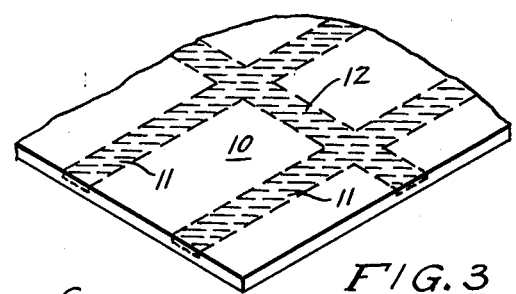
FIG. 3
FIG. 4
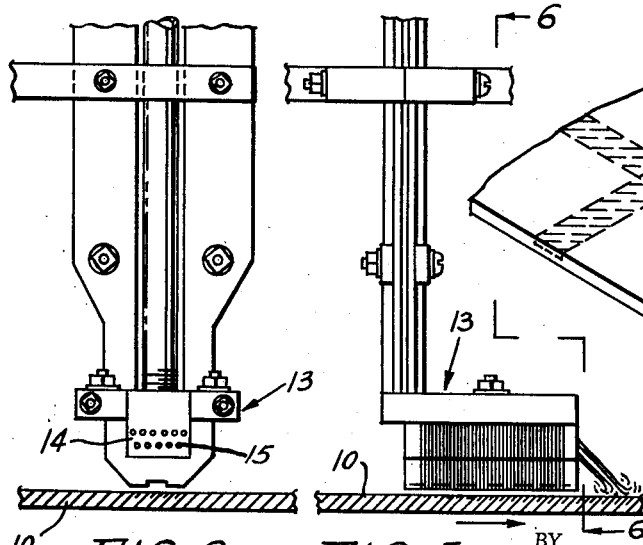
FIG. 6    FIG. 5
INVENTOR
LOYD J. WHITE
BY
Adams & Bush
ATTORNEY United States Patent Office 2,915,813
Patented Dec. 8, 1959

2,915,813

TOOL-RESISTANT METAL JAIL PLATES

Loyd J. White, San Antonio, Tex., assignor to Southern Steel Company, San Antonio, Tex., a corporation of Texas Application May 2, 1956, Serial No. 582,156

1 Claim. (Cl. 29—191.4)

This invention relates to a new type of material for jails or prisons and has more particular reference to tool-resistant metal jail plates such as used for constructing the perimeter walls of maximum security jail cell blocks.

In modern prisons and jails, the perimeter walls of maximum security cell blocks usually consist in part of tool-resistant steel plate walls and ceilings, supported and stiffened by suitable steel structural members. For many years, tool-resistant steel jail plates of a laminated type have been and are now being used in security jail enclosures. Such plate is usually referred to in industry as "5-ply jail plate" and is composed of five alternate laminations; three of which are relative soft, low carbon laminations, not subject to hardening by heat-treatment. The other two laminations are of alloy steel, high in carbon or carbon and chrome content, which make these laminations readily hardenable when properly heat-treated. The five laminations are welded together, rolled to thickness, by the producing steel rolling mill, and delivered to the jail equipment manufacturer, who must fabricate the plate and harden by heat-treatment the two interior hardenable laminations to render the plate resistant to hack saw blades, files and other small cutting tools, such as are frequently smuggled to inmates of jails and prisons. Such plate, however, is expensive to produce and in its fabrication and heat-treatment, the laminations frequently separate, which results in both the loss of the plate and the labor of fabrication.

The primary object of the present invention is to provide a novel and improved tool-resistant metal jail plate to be used in the formation of plate walls and ceilings of maximum security cell blocks and which will be less expensive to produce than a laminated product and which is not subject to the trouble and expense resulting from the frequent separation of laminations.

Another object of the present invention is to provide a jail plate, as characterized above, having a reticulate arrangement or pattern of hardened zones formed therein, with the remaining metal of the plate retaining its original degree of hardness, thereby permitting the formation of bolt or rivet holes therein for securing the plate to connecting and supporting members.

Another object of the present invention is to provide a jail plate, as characterized above, wherein some of the hardened zones are formed on one face of the plate and others are formed on the other face of the plate.

Other objects and advantages of the invention will appear in the following specification when considered in connection with the accompanying drawing, wherein:

Fig. 1 is a plan view of one embodiment of a tool-resistant jail plate constructed in accordance with the present invention;

Fig. 2 is a fragmentary plan view on an enlarged scale of the plate shown in Fig. 1;

Fig. 3 is a fragmentary perspective view of the jail plate shown in Fig. 1;

Fig. 4 is a view similar to that shown in Fig. 3, but of a modified form of plate;

Fig. 5 is a fragmentary diagrammatic side elevational view of a high frequency inductor provided with an integral quench head and showing the manner in which it is employed to form the hardened areas or zones on the plate; and Fig. 6 is an elevational view taken on the line 6—6 of Fig. 5.

The present invention provides a novel and improved tool-resistant metal jail plate to be used in the formation of walls and ceilings of maximum security jail or prison enclosures, and, in general, comprises a flat, metal plate having a reticulate arrangement or pattern of hardened zones formed therein, with the remaining metal of the plate retaining its original degree of hardness to permit bolt or rivet holes to be readily drilled or punched therethrough.

The invention further contemplates that all of the zones forming the reticulate arrangement or pattern may be formed on one face of the plate or one group of the zones may be formed on one face of the plate and another group formed on the opposite face of the plate.

Referring now to the drawing, there is illustrated, in Figs. 1, 2 and 3, one embodiment of a tool-resistant jail plate constructed in accordance with the present invention. As there shown, the plate comprises a rectangular metal plate 10 having a reticulate arrangement or pattern of hardened zones formed on one surface; preferably and as shown, the reticulate arrangement or pattern of hardened zones comprises a first group of hardened zones in the form of laterally spaced parallel bands or strips 11 formed on one surface and extending across the plate in a direction parallel with the longitudinal center line of the plate, and a second group of hardened zones in the form of laterally spaced parallel bands or strips 12 formed on the same surface as the bands 11 and extending across the plate in a direction normal to the direction in which the bands 11 extend.

The width, thickness and spacing of the hardened bands or strips 11 and 12 may be according to any desired predetermined pattern; preferably and as shown, the strips are made ¾" to 1" wide and have a thickness of about ⅓ to ½ of the thickness of the plate, which plate is usually about ¼" thick. Preferably, the longitudinally extending strips 11 are spaced so that the distance between centers is not more than 4" and the transverse strips 12 are spaced so that the distance between centers is not more than 12".

The plate 10 is an integrally formed and initially homogeneous steel plate composed of metal subject to heat and quench hardening and preferably is a steel plate of from four to six feet in width, eight feet in length, and ¼" thick.

In Fig. 4, there is shown a modified form of tool-resistant jail plate. In this particular modification, the plate 10' and the hardened zones or strips 11' and 12' are identical in construction to the corresponding parts shown in the modification illustrated in Figs. 1, 2 and 3, with the exception that the longitudinally extending zones or strips 11' are formed on one face of the plate while the transversely extending hardened zones or strips 12' are formed on the other face of the plate.

The hardened strips or zones are formed in the plate by heating the zones to the proper critical temperature and then quench hardening them. The heating may be accomplished by flame heating, using oxygen and acetylene gas, or by electric induction. Preferably the hardened zones are formed by electric induction heating and quench hardening.

In Fig. 5 there is diagrammatically illustrated a method of forming the hardened zones or strips by electric induction heating and quench hardening. As there shown, the plate is moved at a predetermined rate and at a predetermined distance below a high frequency electric inductor 13 provided with a quench head, indicated at 14, for subsequently directing a quenching medium, such as water, through downwardly slanted openings 15 formed in the quench head and onto the heated strip. The width of the heated strip will depend on the width of the conductor head and the depth or thickness of the hardened strip will depend on the rate of movement of the plate and the intensity of the induced current in the zone of the strip.

High frequency electric currents circulate through the inductor from a power source (not shown) and induce high-frequency currents to flow in the portion of the strip directly under the inductor to heat the surface rapidly and efficiently to above the critical or quench hardening temperature. As the length and width of the heated surface is limited, the plate is progressively moved longitudinally below the inductor in the direction shown by the arrow, thus providing a continuous heated surface. However, before the heat has a chance to penetrate an undue amount, the heated surface is quenched as by spray of water, oil or other quenching medium, thus producing a quench-hardened surface.

Due to the thickness of the plate and the spacing of the hardened zones or strips and their limited width and thickness, the plate, except for the hardened zones, will retain the initial degree of hardness. Little, if any, warping of the plate will occur during the formation of the reticulate pattern of hardened zones thereon, and, if a slight warping does occur, it can be removed by cold rolling the plate.

From the foregoing, it is readily apparent that there has been provided a novel and improved tool-resistant metal plate for use in constructing the walls and ceilings of a maximum security jail or prison enclosure; one which is economical in manufacture, and particularly effective for the purpose for which it is designed.

While the tool-resistant metal plate of the invention is particularly designed to be used in the formation of the walls of maximum security jail or prison cells, obviously, it may be used in constructing the wall, floors, or ceilings of any enclosure, the use of which requires that the walls or like parts be of a construction such that it would be extremely difficult to cut an unauthorized opening therein sufficiently large for a person to escape therethrough.

Obviously, too, the invention is not restricted to the particular embodiment thereof herein shown and described.

What is claimed is:

As an article of manufacture, a tool-resistant metal jail plate to be used in the formation of the walls of a maximum security jail cell or enclosure, comprising an integrally formed and initially homogeneous flat metal plate of a width of from four to six feet, a length of about eight feet, and a thickness of about one-fourth of an inch, composed of steel which is subject to heat-and-quench hardening and having surface areas heat-and-quench hardened to a depth of from one-third to one-half the thickness of the plate to form a reticulated pattern of heat-and-quench hardened zones therein, with the remainder of the plate being of its initial hardness, said reticulated pattern comprising a first group of heat-and-quench hardened zones in the form of laterally spaced parallel bands formed on and extending across one surface of said plate and a second group of heat-and-quench hardened zones in the form of laterally spaced parallel bands formed on and extending across one surface of said plate with the bands of the second group extending in a direction normal to the direction in which the bands of the first group extend, said bands in one group being spaced apart so that the distance between centers will be at least four inches and the bands in the other group being spaced apart so that the distance between each center will be about twelve inches, all the bands in each group being at least from three-fourths to one inch wide.

References Cited in the file of this patent

UNITED STATES PATENTS

| | | |
|---|---|---|
| 232,476 | Ellis | Sept. 21, 1880 |
| 1,280,908 | Wales | Oct. 8, 1918 |
| 1,815,187 | Coles | July 21, 1931 |
| 1,834,750 | Trembour | Dec. 1, 1931 |
| 1,888,042 | Lynn | Nov. 15, 1932 |